Patented Dec. 29, 1931

1,838,368

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

LACQUER COMPOSITION

No Drawing.   Application filed February 10, 1927.   Serial No. 167,367.

This invention relates to lacquer compositions adapted for use on various surfaces, and especially to lacquers containing a cellulose ester product and a polymerization product.

Ordinary lacquers having nitrocellulose, cellulose acetate or some other cellulose ester as a base contain from fifteen to twenty-five per cent. of solid materials, such as cellulose ester, pigment, plasticizers and the like, combined with seventy-five to eighty-five per cent. of solvent. When the lacquer is applied by dipping, brushing or spraying, all the solvents evaporate, leaving behind the small residue of solid materials noted above. This is not the case with oil paints or varnish enamels which contain thirty to sixty per cent. of solids. Furthermore, the solvents used in paints and varnish evaporate only in part, much of the material, such, for example, as linseed oil, being oxidized by the air into a solid substance which adds its weight and body to the film.

The present invention seeks to overcome the lack of solids in a cellulose ester lacquer film by the incorporation in such lacquers of considerable quantities of certain polymerized olefine derivatives. It has been determined by experimentation that these products are soluble in many of the solvents usually employed in the manufacture of lacquers, including in the alkyl ethers of ethylene glycol and other glycols.

Various methods of carrying out the polymerization of the olefine derivatives may be employed, such as exposure to light, heating or heating together with exposure to light. Other methods may involve the use of catalytic agents.

The use of these polymerized olefine derivatives in cellulose ester lacquers materially increases the resistance of the lacquer film to wear and abrasion. It also presents the unexpected advantage of increasing its resistance to ultra violet light or ultra violet rays in ordinary light. This renders it possible to use this lacquer as a finish or gloss coat over ordinary lacquer. Attempts to do this in the past have failed due to the fact that clear lacquers whether of nitrocellulose or cellulose acetate base deteriorate very readily upon exposure to light.

Solutions of these polymerized products are compatible with cellulose ester lacquer solutions and since they dry with exceedingly hard film much larger quantities can be incorporated than is the case when natural or synthetic resins are used, since large amounts of these will soften or weaken the film. Small quantities of natural or synthetic resins may be incorporated in the lacquer but larger amounts tend to render the final film soft and quite readily scratched.

If vinyl chloride and vinyl acetate, for example 30 parts of the chloride and 70 parts of the acetate, are polymerized together, a substance is formed which is soluble in such solvents as toluene, benzene and butyl acetate, and which is less readily combustible than the product obtained by polymerizing vinyl acetate alone. Such product is well adapted for use in lacquers of the type described herein.

What I claim is:

A lacquer containing a cellulose ester, a product soluble in toluene, benzene and butyl acetate and resulting from the polymerization of a mixture of vinyl acetate and vinyl chloride, and a cellulose ester solvent.

In testimony whereof, I affix my signature.

JOSEPH G. DAVIDSON.